United States Patent
Kim et al.

(10) Patent No.: US 9,362,992 B2
(45) Date of Patent: Jun. 7, 2016

(54) METHOD AND APPARATUS FOR TRANSMITTING CHANNEL STATUS INFORMATION IN MULTI-CARRIER WIRELESS COMMUNICATION SYSTEM

(75) Inventors: Hyungtae Kim, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 775 days.

(21) Appl. No.: 13/696,170

(22) PCT Filed: Jun. 3, 2011

(86) PCT No.: PCT/KR2011/004055
§ 371 (c)(1),
(2), (4) Date: Nov. 5, 2012

(87) PCT Pub. No.: WO2011/152674
PCT Pub. Date: Dec. 8, 2011

(65) Prior Publication Data
US 2013/0051275 A1    Feb. 28, 2013

Related U.S. Application Data

(60) Provisional application No. 61/351,294, filed on Jun. 4, 2010.

(51) Int. Cl.
| | | |
|---|---|---|
| H04B 7/04 | (2006.01) | |
| H04L 5/00 | (2006.01) | |
| H04L 25/02 | (2006.01) | |
| H04B 7/06 | (2006.01) | |

(52) U.S. Cl.
CPC .............. *H04B 7/0417* (2013.01); *H04B 7/065* (2013.01); *H04L 5/0053* (2013.01); *H04L 25/022* (2013.01); *H04B 7/063* (2013.01); *H04B 7/0632* (2013.01); *H04B 7/0634* (2013.01)

(58) Field of Classification Search
CPC .... H04B 7/0417; H04B 7/0632; H04B 7/065; H04B 7/063
See application file for complete search history.

(56) References Cited

U.S. PATENT DOCUMENTS

| | | |
|---|---|---|
| 2005/0232156 A1 | 10/2005 | Kim et al. |
| 2010/0118817 A1* | 5/2010 | Damnjanovic et al. ....... 370/329 |

(Continued)

FOREIGN PATENT DOCUMENTS

| | | |
|---|---|---|
| KR | 10-2009-0017963 A | 2/2009 |
| KR | 10-20090017963 A * | 2/2009 |

(Continued)

*Primary Examiner* — Siming Liu
(74) *Attorney, Agent, or Firm* — Birch, Stewart, Kolasch & Birch, LLP

(57) ABSTRACT

The present invention relates to a wireless communication system, and more particularly, to a method and apparatus for transmitting channel status information (CSI) in a wireless communication system which supports multiple carriers. According to one embodiment of the present invention, a method for transmitting channel status information for multiple carriers comprises the steps of: measuring downlink channels for first and second carriers which are closely placed to each other on the frequency domain; determining channel status information for the first carrier on the basis of a result of the channel measurement for the first carrier; determining channel status information for the second carrier on the basis of a part of the channel status information for the first carrier and a result of the channel measurement for the second carrier; and transmitting channel status information for the first and second carriers.

10 Claims, 10 Drawing Sheets

(56) References Cited

U.S. PATENT DOCUMENTS

2011/0080968 A1* 4/2011 Seo et al. .................. 375/267
2011/0158123 A1 6/2011 Kim et al.

FOREIGN PATENT DOCUMENTS

| KR | 10-0946923 B1 | 3/2010 |
| WO | WO 2010/048429 A2 | 4/2010 |

* cited by examiner

METHOD AND APPARATUS FOR TRANSMITTING CHANNEL STATUS INFORMATION IN MULTI-CARRIER WIRELESS COMMUNICATION SYSTEM

CROSS-REFERENCE TO RELATED APPLICATIONS

This non-provisional application is a 371 of International Application No. PCT/KR2011/004055 filed on Jun. 3, 2011, which claims the benefit of U.S. Provisional Application No. 61/351,294 filed on Jun. 4, 2010. The entire contents of the above applications are hereby incorporated by reference.

TECHNICAL FIELD

The present invention relates to a wireless communication system, and more particularly, to a method and apparatus for transmitting channel status information in a wireless communication system that supports multiple carriers.

BACKGROUND ART

MIMO (Multiple-Input Multiple-Output) technology means a method for improving efficiency in data transmission and reception by using multiple transmitting antennas and multiple receiving antennas instead of a single transmitting antenna and a single receiving antenna. Namely, the MIMO technology is to increase capacity or improve throughput by using multiple antennas in a transmitting end or receiving end of a wireless communication system. Herein, the MIMO technology may be referred to as multi-antenna technology.

In a multi-antenna wireless communication system according to the related art, a rank indicator (RI), a precoding matrix index (PMI), channel quality information (CQI), etc. are defined as information fed back from a receiving end (for example, user equipment) to a transmitting end (for example, base station). Such feedback information may be referred to as channel status information (CSI). The user equipment may feed its preferred PMI and RI back to the base station on the basis of the result of a channel measured by the user equipment. In this case, the PMI and RI preferred by the user equipment, if used by the base station at a given channel status, correspond to downlink transmission rank value and precoder information, which may have the highest transmission rate. Also, CQI is calculated on the basis of the PMI/RI reported by the user equipment, and corresponds to a modulation and coding scheme (MCS) level applied to downlink transmission. In this case, the CQI may represent MCS level that provides a packet error rate within the allowable range if precoder information and rank value based on the PMI/RI reported by the user equipment are used.

DISCLOSURE

Technical Problem

Introduction of a new system having more extended antenna configuration than the existing multi-antenna wireless communication system has been discussed. For example, although the existing system has supported four transmitting antennas only, the new system having extended antenna configuration may provide more increased system capacity by supporting MIMO transmission through eight transmitting antennas. Also, although an uplink and a downlink are configured by one carrier in the existing wireless communication system, a carrier aggregation technology or multi-carrier technology, which uses a plurality of carriers through grouping to support extended bandwidth, has been discussed.

If the existing channel status information feedback scheme is applied to the system that supports the extended antenna configuration and multiple carriers, a problem occurs in that feedback overhead is increased as the number of carriers is increased.

Accordingly, an object of the present invention devised to solve the conventional problem is to provide a method and apparatus for efficiently feeding back channel status information (CSI) in a system that supports extended antenna configuration and multiple carriers.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for transmitting channel status information for multiple carriers comprises the steps of measuring downlink channels for first and second neighboring carriers on a frequency domain; determining channel status information for the first carrier on the basis of a result of channel measurement for the first carrier; determining channel status information for the second carrier on the basis of a part of the channel status information for the first carrier and a result of channel measurement for the second carrier; and transmitting the channel status information for the first and second carriers.

To solve the aforementioned technical problems, according to another embodiment of the present invention, a user equipment for transmitting channel status information for multiple carriers comprises a reception module receiving downlink signals on first and second carriers from a base station; a transmission module transmitting an uplink signal to the base station; and a processor controlling the user equipment, which includes the reception module and the transmission module, wherein the processor measures the downlink channels for the first and second neighboring carriers on a frequency domain, determines channel status information for the first carrier on the basis of a result of channel measurement for the first carrier, determines channel status information for the second carrier on the basis of a part of the channel status information for the first carrier and a result of channel measurement for the second carrier, and transmits the channel status information for the first and second carriers.

The following matters may commonly be applied to the aforementioned embodiments of the present invention.

The part of the channel status information for the first carrier may be one or more of rank information for the first carrier and long term-wideband precoding matrix information for the first carrier.

One or more of rank information for the second carrier and long term-wideband precoding matrix information for the second carrier may not be transmitted.

Short term-subband precoding matrix information and channel quality information for the second carrier may be determined on the basis of the rank information for the first carrier if the rank information for the second carrier is not transmitted, and may be determined on the basis of the long term-wideband precoding matrix information for the first carrier if the long term-wideband precoding matrix information for the second carrier is not transmitted.

Information indicating a difference value between the rank information for the first carrier and the rank information for the second carrier may be transmitted instead of the rank information for the second carrier.

Information indicating a difference value between the long term-wideband precoding matrix information for the first carrier and the long term-wideband precoding information for the second carrier may be transmitted instead of the long term-wideband precoding information for the second carrier.

The aforementioned embodiments and the following detailed description of the present invention are only exemplary, and are for additional description of the present invention cited in claims.

Advantageous Effects

According to the present invention, a method and apparatus for efficiently transmitting and receiving channel status information in a wireless communication system that supports multiple carriers may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
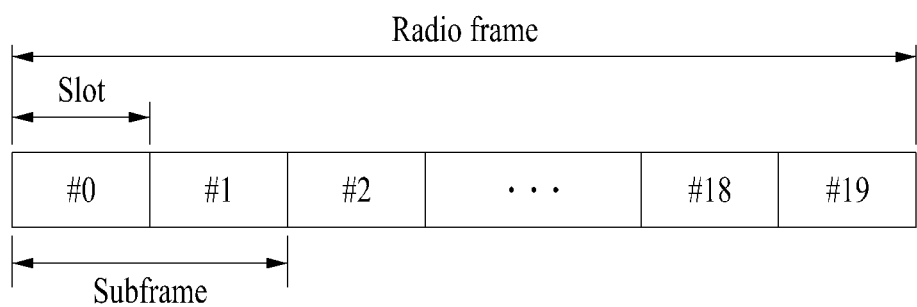
FIG. 1 is a diagram illustrating a structure of a radio frame used in a 3GPP LTE system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. The base station (BS) may be replaced with terms such as a fixed station, Node B, eNode B (eNB), and an access point (AP). Also, the term, the base station may be used as a concept that includes a cell or sector. Meanwhile, a relay may be replaced with a relay node (RN) or a relay station (RS). A terminal may be replaced with terms such as a user equipment (UE), a mobile station (MS), a mobile subscriber station (MSS), or a subscriber station (SS).

In the present invention, a downlink transmission entity may be a base station or a relay node (if the relay node is an access downlink transmission entity to the user equipment), and a downlink reception entity may be a user equipment or a relay node (if the relay node is a backhaul downlink reception entity from the base station). Hereinafter, an example of the downlink transmission entity will be, but not limited to, the base station, and an example of the downlink reception entity will be, but not limited to, the user equipment. A random downlink transmission entity and a random downlink reception entity may be applied to the present invention.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE and LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE system and the 3GPP LTE-A system.

FIG. 1 is a diagram illustrating a structure of a radio frame used in a 3GPP LTE system. One radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot may include a plurality of OFDM symbols in a time domain. Since OFDMA is used on a downlink in the 3GPP LTE system, the OFDM symbols represent one symbol period. One symbol may be referred to as SC-FDMA symbols or symbol period on the uplink. A resource block (RB) is a resource allocation unit and includes a plurality of continuous subcarriers at one slot. The aforementioned structure of the radio frame is only exemplary. Accordingly, various modifications may be made in the number of subframes included in one radio frame, the number of slots included in one subframe, or the number of OFDM symbols included in one slot.

Figure 2:
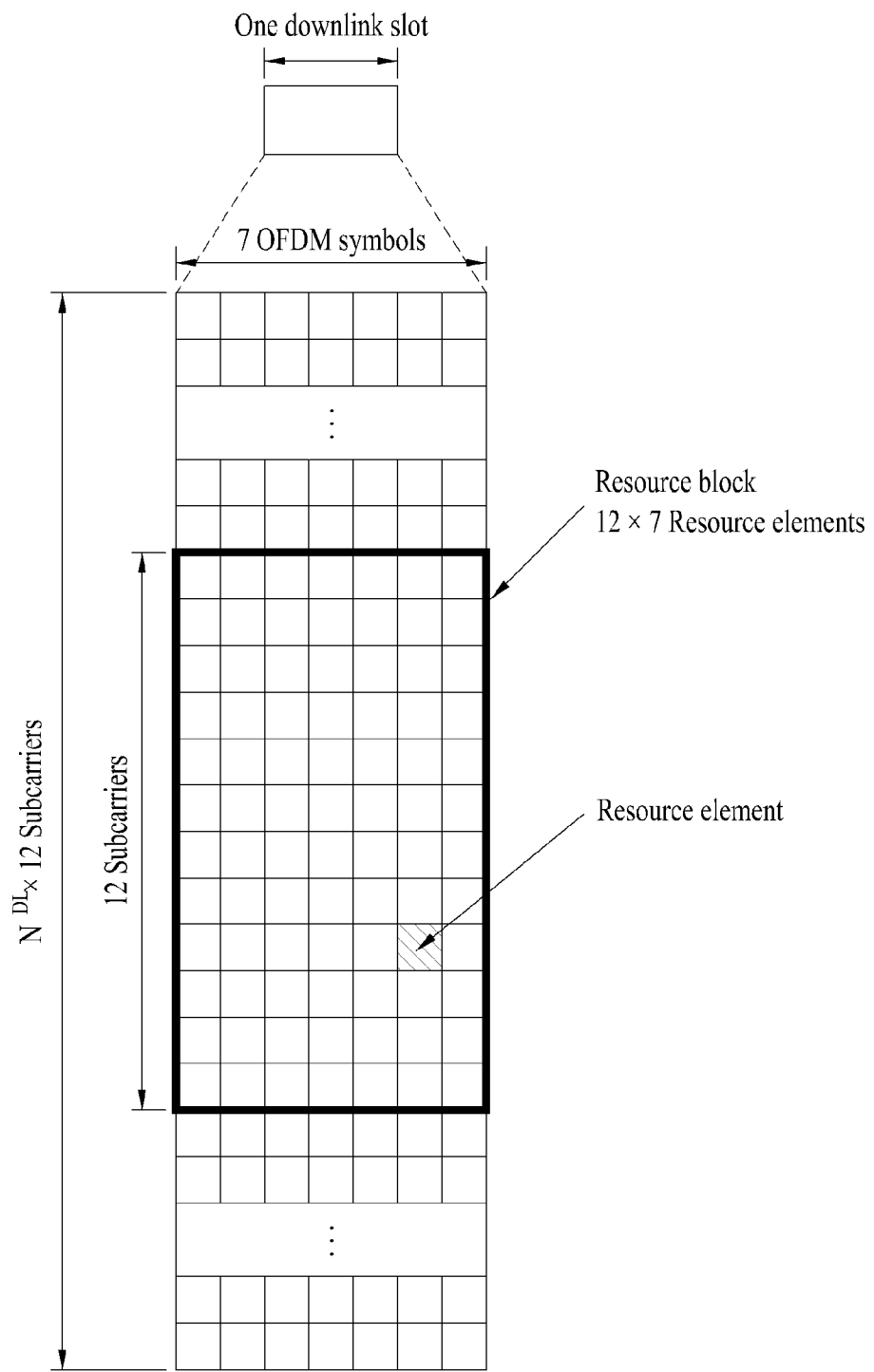
FIG. 2 is a diagram illustrating an example of a resource grid for a downlink slot.

FIG. 2 is a diagram illustrating an example of a resource grid at a downlink slot. One downlink slot includes, but not limited to, seven OFDM symbols in a time domain, and one resource block (RB) includes, but not limited to, twelve subcarriers in a frequency domain. For example, although one slot includes seven OFDM symbols in case of normal cyclic prefix (CP), one slot may include six OFDM symbols in case of extended CP. Each element on the resource grid will be referred to as a resource element (RE). One resource block includes 12×7 resource elements. The number $N^{DL}$ of resource blocks included in the downlink slot depends on a downlink transmission bandwidth. A structure of an uplink slot may be the same as that of the downlink slot.

Figure 3:
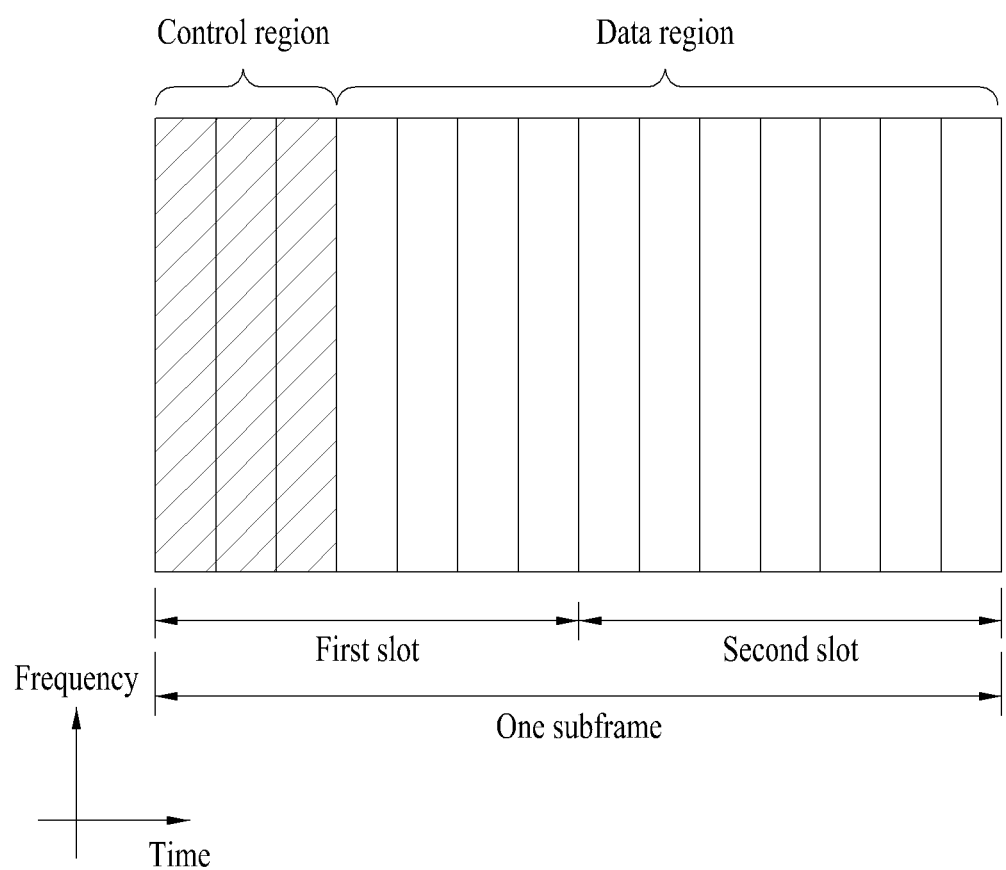
FIG. 3 is a diagram illustrating a structure of a downlink subframe.

FIG. 3 is a diagram illustrating a structure of a downlink subframe. Maximum three OFDM symbols located at the front of the first slot within one subframe correspond to a control region to which a control channel is allocated. The other OFDM symbols correspond to a data region to which a physical downlink shared channel (PDSCH) is allocated. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and includes information on the number of OFDM symbols used for transmission of the control channel within the subframe. The PHICH includes HARQ ACK/NACK signal in response to uplink transmission. The control information transmitted through the PDCCH will be referred to as downlink control information (DCI).

The DCI includes uplink or downlink scheduling information, or uplink transmission (Tx) power control command for a random user equipment group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). The PDCCH is transmitted by aggregation of one or more continuous control channel elements (CCEs). The CCE is a logic allocation unit used to provide the PDCCH at a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCE. The base station determines a PDCCH format depending on the DCI transmitted to the user equipment, and attaches cyclic redundancy check (CRC) to the control information. The CRC is masked with an identifier (for example, radio network temporary identifier (RNTI)) depending on owner or usage of the PDCCH. If the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). In order to represent a random access response which is the response to transmission of a random access preamble of the user equipment, the CRC may be masked with a random access RNTI (RA-RNTI). Also, if the PDCCH is for a transmit power control (TPC) command for the uplink transmission power of the user equipment, the CRC may be masked with transmit power control identifier (TPC-RNTI).

A plurality of PDCCHs may be transmitted within the control region. The user equipment may monitor the plurality of PDCCHs. In this case, monitoring means that the user equipment attempts decoding for each of the PDCCHs in accordance with the DCI format. The base station may not provide the user equipment with information on where the corresponding PDCCH is located within the control region allocated within the subframe. The user equipment searches for its PDCCH by monitoring a set of PDCCH candidates within the subframe. This will be referred to as blind decoding. For example, if the user equipment performs demasking for its PDCCH and no CRC error is detected from the corresponding PDCCH, the user equipment detects a PDCCH having its DCI. The user equipment may be configured to receive PDSCH data transmission signaled through the PDCCH based on various transmission modes, and this configuration may be designated semi-statically through upper layer signaling.

Figure 4:
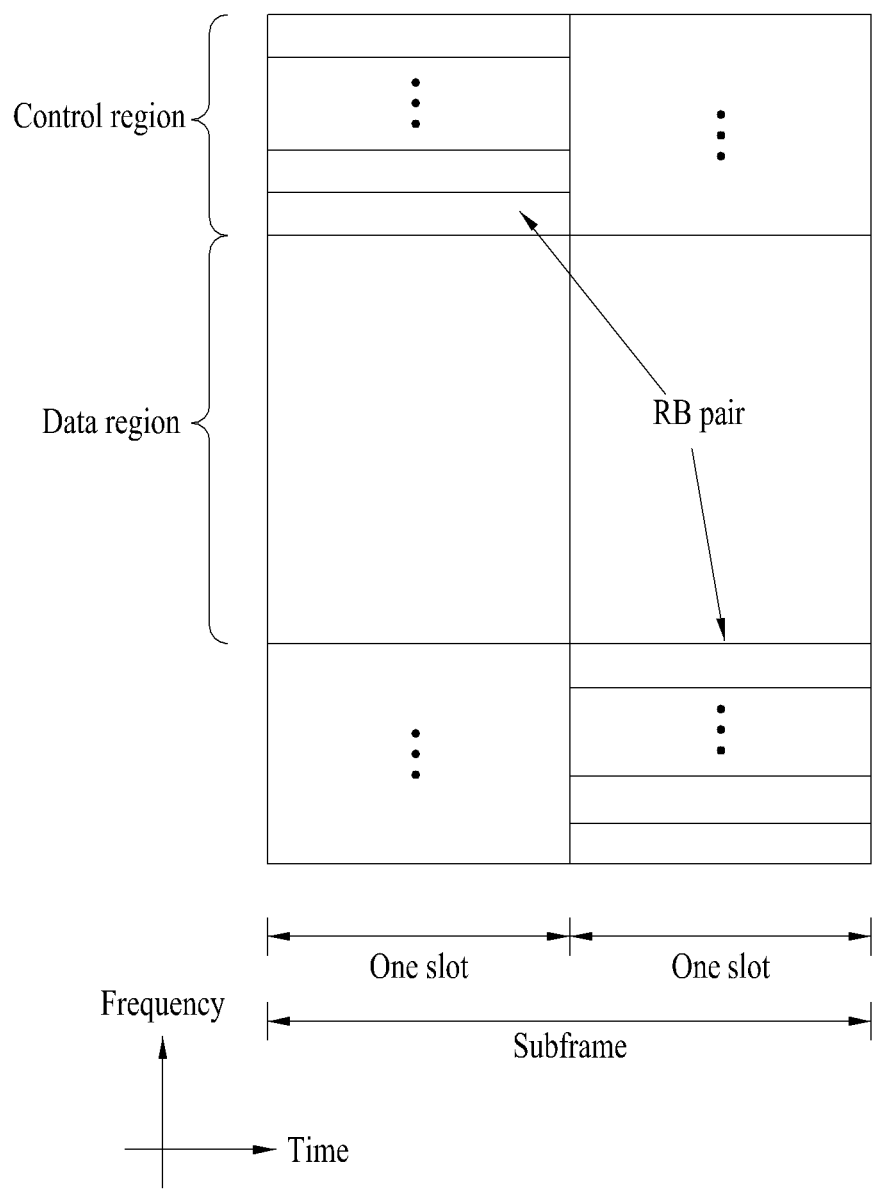
FIG. 4 is a diagram illustrating a structure of an uplink subframe.

FIG. 4 is a diagram illustrating a structure of an uplink subframe. The uplink subframe may be divided into a control region and a data region in a frequency domain. A physical uplink control channel (PUCCH) which includes uplink control information is allocated to the control region. A physical uplink shared channel (PUSCH) which includes user data is allocated to the data region. In order to maintain single carrier properties, one user equipment does not transmit the PUCCH and the PUSCH at the same time. The PUCCH for one user equipment is allocated to a pair of RBs at the subframe. Resource blocks belonging to the pair of RBs occupy different subcarriers for two slots. This will be referred to frequency hopping of a pair of RBs allocated to the PUCCH at the boundary of the slots.

Feedback of Channel Status Information

In order to perform the MIMO scheme normally, a receiving end may feed a rank indicator (RI), a precoding matrix index (PMI) and a channel quality indicator (CQI) back to a transmitting end. These RI, PMI and CQI may be referred to as channel status information (CSI).

The RI is information on a channel rank. The rank of the channel means a maximum number of layers that may transmit different kinds of information. The RI is determined from the number of allocated transmission layers, and may be acquired from related downlink control information (DCI).

The PMI is information on a precoding matrix used for transmission from the transmitting end. Precoding means mapping of a transmission layer into a transmitting antenna. A layer-to-antenna mapping relation may be determined by a precoding matrix. In order to reduce feedback overhead of precoding information, the transmitting end and the receiving end previously share a codebook, which includes several precoding matrixes, and a scheme for feeding back only index indicating a specific precoding matrix from the corresponding codebook may be used.

The CQI is information indicating channel quality. The CQI may be expressed by previously determined MCS combination. In other words, the CQI index, which is fed back, represents a corresponding modulation scheme and code rate.

In the meantime, a new CSI feedback method may be used for a system (for example, LTE-A system) that supports extended antenna configuration. For example, precoding information fed back from the receiving end may be indicated by combination of two PMIs. One (first PMI) of the two PMIs has an attribute of long term-wideband, and may be referred to as W1. The other one (second PMI) of the two PMIs has an attribute of short term-wideband, and may be referred to as W2. Final PMI may be determined by combination (or function) of W1 and W2. For example, if the final PMI is W, W=W1*W2 or W=W2*W1 may be defined.

As described above, in the LTE-A system, CSI may include RI, W1, W2 and CQI. Accordingly, it is required that a new method for transmitting and receiving feedback information should be defined. In this respect, detailed embodiments of the present invention will be described later.

Carrier Aggregation

The introduction of the carrier aggregation (CA) technology is considered in the advanced OFDM based mobile communication system. The carrier aggregation technology means the technology that may achieve a high data transmission rate by performing uplink/downlink transmission simultaneously using one or more carriers (component carriers (CC) or cells) designated individually for the downlink or the uplink. The system to which the carrier aggregation technology is applied will be referred to as a multiple carrier system. Hereinafter, an uplink carrier which is a target of carrier aggregation will simply be referred to as UL CC or UL cell, and a downlink carrier will simply be referred to as DL CC or DL cell. In other words, in the following description in respect of carrier aggregation, the term, cell means CC.

A bandwidth of one cell may correspond to a system bandwidth in the existing system (LTE release-8 or 9). For example, five DL cells each having a bandwidth of 20 MHz may be aggregated to perform downlink transmission through a bandwidth of 100 MHz. Alternatively, a carrier aggregation system may be configured by grouping cells of different bandwidth sizes. In this case, although each cell may exist on neighboring frequencies (or contiguous frequencies), a carrier aggregation system may be configured by grouping cells on frequencies which do not adjoin one another.

If the multi-carrier technology is used, the user equipment may monitor and receive downlink signals/data on a plurality of DL cells at the same time. However, even though the base station manages N number of DL cells, if the network configures M (M≤N) number of DL cells for the user equipment, monitoring of the downlink signals/data of the user equipment may be limited to M number of DL cells. Also, if the network configures L (L≤M≤N) number of DL cells as main DL cells, the user equipment may first monitor and receive the downlink signals/data of the L number of DL cells. These L number of DL cells may be expressed as downlink primary cells (DL P-cell) or downlink (DL) anchor cells, and the DL P-cell may be configured user equipment-specifically or cell-specifically.

Similarly, a plurality of UL cells may be used for uplink transmission of a random user equipment. The user equipment may configure a part of the plurality of UL cells as a primary cell that transmits important information to the base station. This will be expressed as uplink primary cell (UL P-cell) or uplink (UL) anchor cell.

If the multi-carrier technology is used, it is required that CSI on each DL cell should be reported from the user equipment to the base station. In this case, overhead of CSI feedback is increased. Hereinafter, various embodiments of the present invention, which efficiently transmit CSI for multiple carriers to prevent feedback overhead from being increased, will be described.

CSI Report in Multi-Carrier System

Figure 5:
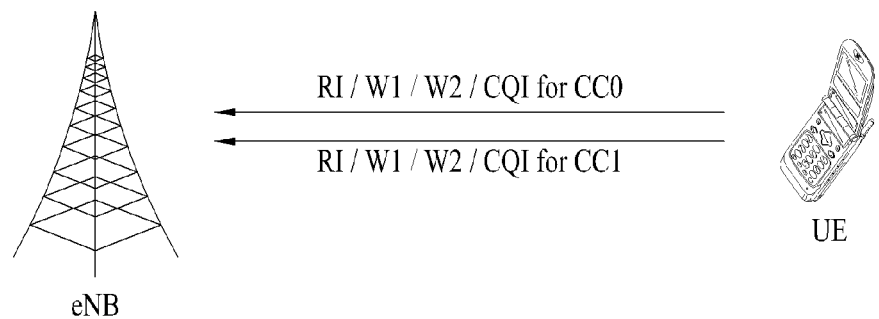
FIG. 5 is a diagram illustrating an example of CSI feedback for multiple carriers.

If the existing CSI transmission scheme is simply applied to the multi-carrier system, it may be assumed that CSI corresponding to each cell (or CC) is additionally reported. In FIG. 5, if two DL cells are configured, CSI (RI/W1/W2/CQI) for each of the cells CC0 and CC1 is transmitted from the user equipment to the base station. In this way, if the multi-carrier CSI report scheme is defined, it is advantageous in that exact CSI may be provided to each of the cells. However, overhead may be increased due to additional feedback information. If CSI report for DL cells more than two is required, feedback overhead is linearly increased in accordance with the number of the increased cells. In this case, among resources that may be used by the user equipment for transmission to the base station, the resources that may be used for data transmission are reduced as overhead for a control signal is increased. In order to solve this problem, the present invention suggests a method for efficiently transmitting CSI to reduce feedback overhead while obtaining sufficient CSI exactness.

In order to reduce CSI feedback overhead, properties of each of RI, W1, W2 and CQI, which constitute CSI, will be described.

RI and W1 reflect average properties on a frequency or time domain of a channel. In other words, RI and W1 may reflect channel properties of wideband in the frequency domain and channel properties of long term in the time domain. In order to briefly express the properties of RI and W1, RI and W1 will be referred to as CSI of long term-wideband properties in this specification. In other words, the term CSI of long term-wideband properties in this specification means CSI that reflects properties of long term channel on the time domain, CSI that reflects properties of wideband channel on the frequency domain, or CSI that reflects properties of long term on the time domain and properties of wideband channel on the frequency domain.

In the meantime, W2 and CQI are determined on the basis of RI and W1, and reflect channel properties relatively more instantaneous than those of RI and W1. In other words, W2 and CQI may reflect channel properties of subband in the frequency domain, and may reflect channel properties of short term in the time domain. In order to briefly express the properties of W2 and CQI, W2 and CQI will be referred to as CSI of short term-subband properties in this specification. In other words, the term CSI of short term-subband properties in this specification means CSI that reflects properties of short term channel on the time domain, CSI that reflects properties of subband channel on the frequency domain, or CSI that reflects properties of short term on the time domain and properties of subband channel on the frequency domain.

Since CSI (RI and W1) of long term-wideband properties represents average channel properties for several time resources or several frequency domains, it is likely that the CSI has properties similar to those of long-term wideband for other neighboring time domain or other neighboring frequency domain.

In more detail, W1 which is CSI of long term-wideband properties may be a covariance matrix of a channel, which is averaged over several frequencies as expressed by Equation 1 below.

$$R_j = \frac{1}{N}\sum_{i=1}^{N} H(f_i^j)^H H(f_i^j)$$ [Equation 1]

In the Equation 1, $R_j$ is the covariance matrix for a channel of the jth cell (or CC), $f_i^j$ represents the ith frequency band of the jth cell, and $H(f_i^j)$ represents a channel corresponding to $f_i^j$. $X^H$ means a hermitian matrix for a matrix X. If the nth cell and the mth cell exist at their respective frequency, domains different from each other but adjacent to each other, it is expected that channels of long term-wideband properties for the respective cells have similar properties. In other words, it is likely that $R_n$ and $R_m$ which are average channel information for each of the nth cell and the mth cell have similar values.

Also, it is likely that RI values for neighboring cells have similarity. RI is CSI of long term-wideband properties, which is determined by the average receiving power from a serving base station, the average interference signal power from another neighboring base station, an average channel, etc. Accordingly, RI for neighboring cells may have similarity due to similarity of W1 value for neighboring cells. Moreover, supposing that the average receiving signal power and the interference signal power for the respective cells are similar, RI for each cell is mainly determined by the W1 value which is average channel information. As described above, since it is likely that W1 values for cells existing on neighboring frequencies have similarity, it is likely that RIs for cells existing on neighboring frequencies have similarity.

Figure 6:
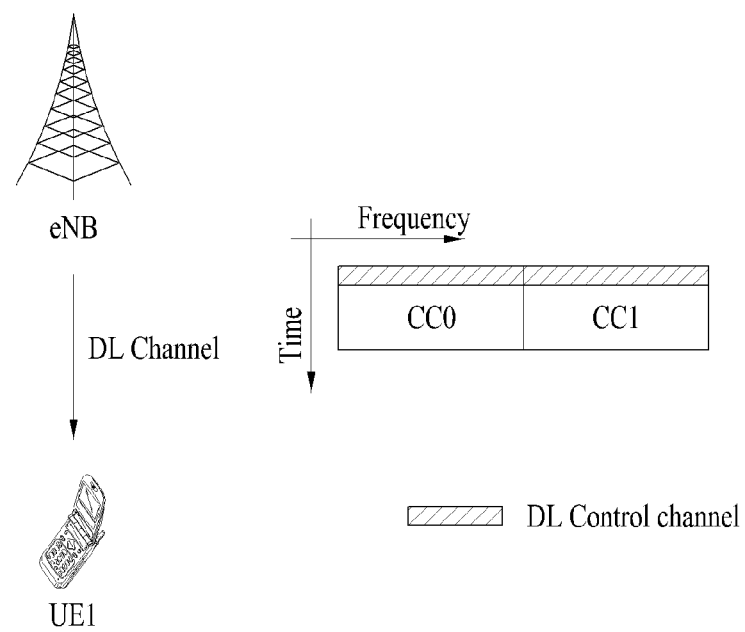
FIG. 6 is a diagram illustrating an example of aggregation of two neighboring carriers on a frequency.

FIG. 6 is a diagram illustrating an example of a downlink band through aggregation of multiple carriers. In FIG. 6, two neighboring cells CC0 and CC1 are aggregated on the frequency domain. The user equipment UE1 may receive control information from the base station eNB through a DL control channel PDCCH of CC0, and may receive a downlink data signal through one of two cells CC0 and CC1 or a plurality of cells.

Hereinafter, the embodiments of the present invention, in which CSI for multiple carriers is efficiently transmitted considering similarity of CSI of long term-wideband properties for cells on neighboring frequencies as described above, will be described in more detail with reference to the multi-carrier support system as shown in FIG. 6. However, the multi-carrier system as shown in FIG. 6 is only exemplary, and it will be apparent that the same principle described in the present invention may be applied to even the case where the multi-carrier system is configured by aggregation of three or more cells.

Embodiment 1

According to this embodiment, CSI of long term-wideband properties and CSI of short term-wideband properties for one of neighboring cells may all be fed back, and CSI of long term-wideband properties for the other one cell may not be fed back.

Figure 7:
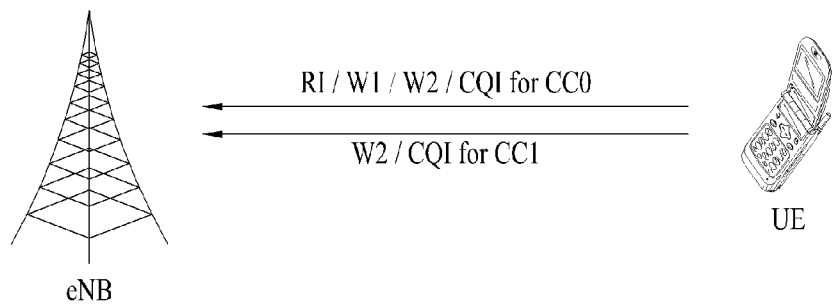
FIG. 7 is a diagram illustrating a method for feeding back CSI for multiple carriers in accordance with one embodiment of the present invention.

For example, as shown in FIG. 7, R1, W1, W2 and CQI may be fed back for CC0 but W2 and CQI may only be fed back for CC1. At this time, the user equipment UE may calculate W2 and CQI of CC1 by regarding RI and W1 of CC0 as long term-wideband properties of CC1. As described above, since it is likely that RI and W1 for CC0 have similar values to those of RI and W1 for CC1, even though W2 and CQI are calculated without feedback of RI and W1 for CC1 like this embodiment, channel information which does not depart from actual channel properties may be fed back. As a result, since feedback of CSI of long term-wideband properties for one of neighboring CCs is omitted, feedback overhead may be reduced.

Embodiment 2

According to this embodiment, CSI of long term-wideband properties and CSI of short term-subband properties for one of neighboring cells may all be fed back, and RI for the other one cell may be fed back but W1 may not be fed back.

Figure 8:
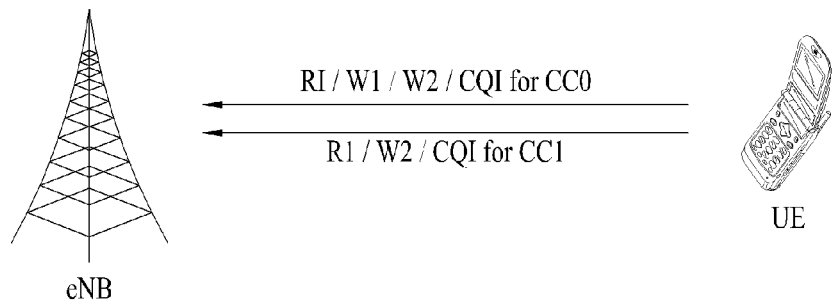
FIG. 8 is a diagram illustrating a method for feeding back CSI for multiple carriers in accordance with another embodiment of the present invention.

For example, as shown in FIG. 8, R1, W1, W2 and CQI may be fed back for CC0 but R1, W2 and CQI may only be fed back for CC1. At this time, the user equipment UE may calculate W2 and CQI of CC1 on the basis of RI for CC1 and W1 for CC0 by regarding W1 of CC0 as W1 of CC1. As described above, since it is likely that W1 for CC0 has a similar value to that of W1 for CC1, even though W2 and CQI are calculated without feedback of W1 for CC1 like this embodiment, channel information which does not depart from actual channel properties may be fed back. As a result, since feedback of W1 for one of neighboring CCs is omitted, feedback overhead may be reduced.

The feedback scheme according to this embodiment may be applied more effectively to the case where interference environments for multiple carriers are different.

Figure 9:
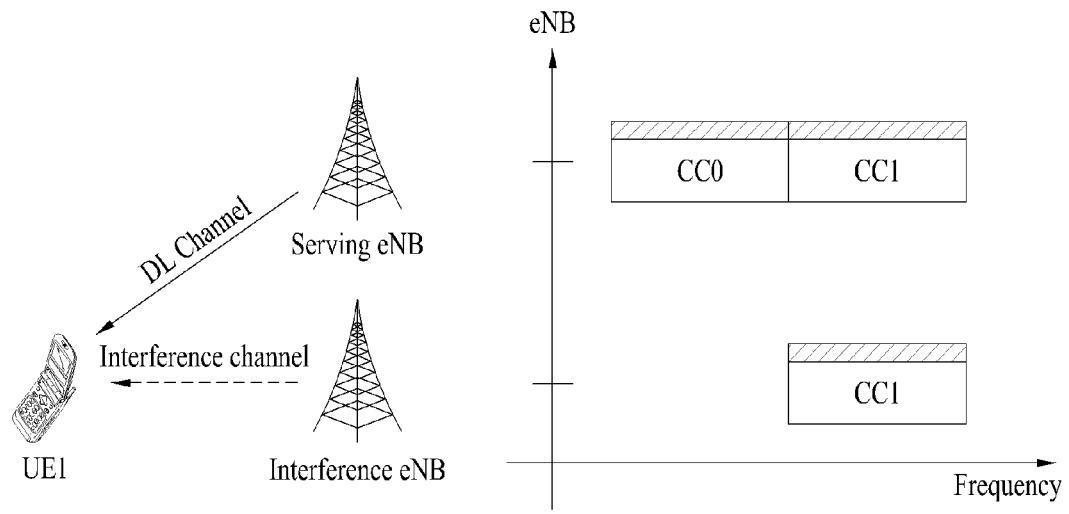
FIG. 9 is a diagram illustrating an example of inter-carrier interference when an interference base station exists.

For example, as shown in FIG. 9, it is assumed that an interference base station uses CC1 as a downlink frequency band. The interference base station may be a micro base station such as a femto cell. At the same time, it is assumed that the user equipment UE1 receives a downlink signal from the serving base station through CC0 and CC1. At this time, if the user equipment is located near the interference base station, interference for a channel of CC1 received by the user equipment may occur due to a signal from the interference base station on CC1. Meanwhile, interference from a neighboring base station does not exist on CC0. In this case, different environments may be given for the respective DL cells where the user equipment receives a downlink signal from the serving base station.

In FIG. 9, it is likely that a rank value of CC1 is less than that of CC0. In this case, since RI of CC0 may not be regarded to be the same as RI of CC1, it is required that RI for each cell should be fed back.

At this time, although RI for CC0 and RI for CC1 may be fed back separately, a difference value RI' between RI of CC0 and RI of CC1 may be fed back instead of RI for CC1. In other words, R1, W1, W2 and CQI may be fed back for CC0 and RI', W2 and CQI may be fed back for CC1. As a result, feedback overhead may be more reduced.

Embodiment 3

According to this embodiment, CSI of long term-wideband properties and CSI of short term-subband properties for one of neighboring cells may all be fed back, and W1 for the other one cell may be fed back but RI may not be fed back.

Figure 10:
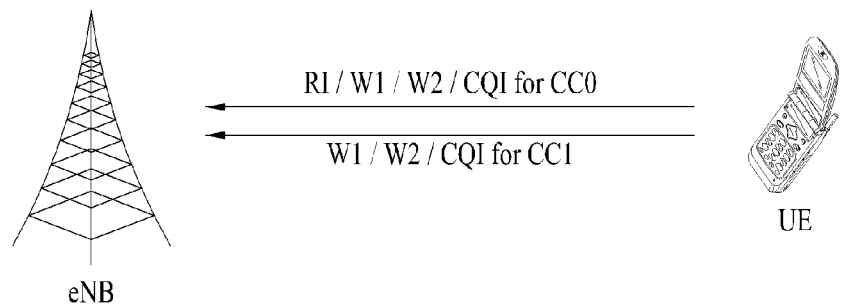
FIG. 10 and FIG. 11 are diagrams illustrating a method for feeding back CSI for multiple carriers in accordance with still another embodiment of the present invention.

For example, as shown in FIG. 10, R1, W1, W2 and CQI may be fed back for CC0 but W1, W2 and CQI may only be fed back for CC1. At this time, the user equipment UE may calculate W2 and CQI of CC1 on the basis of RI for CC0 and W1 for CC1 by regarding RI of CC0 as RI of CC1. As described above, since it is likely that RI for CC0 has a similar value to that of RI for CC1, even though W2 and CQI are calculated without feedback of RI for CC1 like this embodiment, channel information which does not depart from actual channel properties may be fed back. As a result, since feedback of RI for one of neighboring CCs is omitted, feedback overhead may be reduced.

Figure 11:
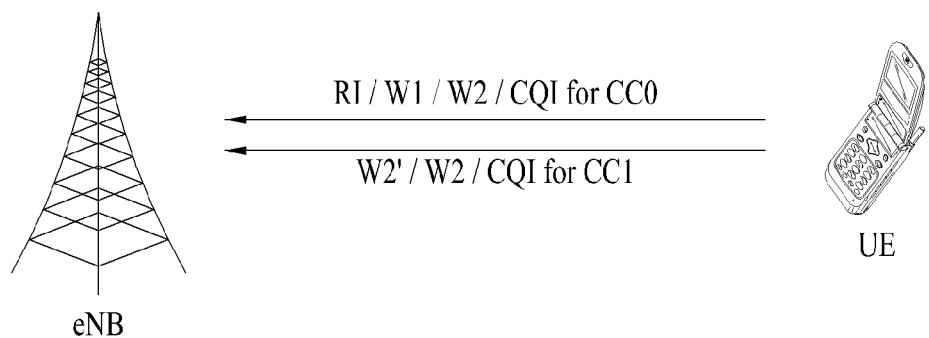

FIG. 11 is a diagram illustrating a method for feeding back CSI in accordance with a modified embodiment of the present invention. For example, as shown in FIG. 11, RI, W1, W2 and CQI may be fed back for CC0, and W2', W2 and CQO may be fed back for CC1. In this case, W2' is a factor that may obtain a value close to W1 for CC1 on the basis of W1 for CC0.

In more detail, supposing that W1 values for CC0 and CC1 are $W1_{CC0}$ and $W1_{CC1}$, $W1_{CC1}$ may be expressed as a function of $W1_{CC0}$ and W2', that is, $f(W1_{CC0}, W2')$. In this case, W2' is an index indicating one (that is, codeword) of precoding matrixes constituting a codebook for W2, and $f(W1_{CC0}, W2')$ is a function that outputs a matrix closest to $W1_{CC1}$ through $W1_{CC0}$ and W2'. This may be expressed by the following Equation 2.

$$\hat{W}1_{CC1} \approx f(W1_{CC0}, W2') \quad \text{[Equation 2]}$$

In the above Equation 2, $\ddot{W}1_{CC1}$ means a matrix closest to actual W1 for CC1.

Also, W2' may be expressed by the following Equation 3.

$$W2' = \underset{cw \in CB}{\arg\min}\, d(W1_{CC1}, f(W1_{CC0}, cw)) \quad \text{[Equation 3]}$$

In the above Equation 3, CB means a codebook of W2, and cw means a codeword that belongs to the corresponding codebook. d(A, B) represents a distance between a matrix A and a matrix B, for example, a chordal distance. f(A, B) is a codebook transformation function, and may be defined as f(A, B)=AB or f(A, B)=BA.

The user equipment (UE) may assume that RI for CC0 is the same as that for CC1 and $\hat{W}_{CC1}$ for CC1 is W1 for CC1. Accordingly, the user equipment may calculate W2 and CQI for CC1 on the basis of RI for CC0 and $\hat{W}1_{CC1}$.

Embodiment 4

According to this embodiment, CSI of long term-wideband properties and CSI of short term-subband properties for one of neighboring cells may all be fed back, and W2' instead of W1 for the other one cell may be fed back.

Figure 12:
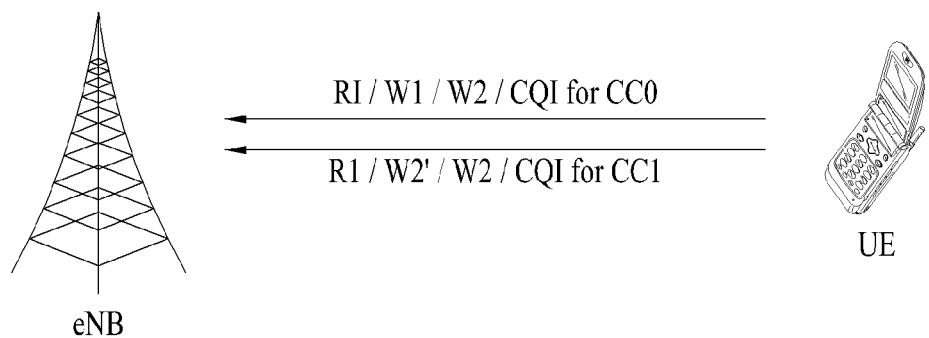
FIG. 12 is a diagram illustrating a method for feeding back CSI for multiple carriers in accordance with further still another embodiment of the present invention.

For example, as shown in FIG. 12, R1, W1, W2 and CQI may be fed back for CC0 but RI, W2', W2 and CQI may be fed back for CC1. At this time, the user equipment UE may assume $\hat{W}1_{CC1}$ determined on the basis of W1 and W2' for CC0 as W1 for CC1. Accordingly, the user equipment UE may calculate CQI and W2 of CC1 on the basis of RI for CC1 and $\hat{W}1_{CC1}$.

Moreover, as described in the embodiment 2, instead of RI for CC1, RI' (difference value between RI of CC0 and RI of CC1) may be fed back. In this case, RI', W2', W2 and CQI may be fed back for CC1.

Also, as described in the embodiment 3, instead of W2' for CC1, W1 for CC1 may be fed back. In this case, RI', W1, W2 and CQI may be fed back for CC1.

As described above, based on that CSI of long term-wideband properties for each of two or more carriers (cells or CC) existing on neighboring frequencies have similarity, various embodiments for feeding back exact channel information while reducing feedback overhead of CSI for multiple carriers have been described. Although RI and W1 have been described as CSI of long term-wideband properties, The CSI of long term-wideband properties is not limited to RI and W1. For example, CQI also includes CQI having long term-wideband properties and CQI having short term-subband properties. CQI having long term-wideband properties may be fed back for any one carrier using similarity between carriers on neighboring frequencies, and assuming that CQIs of neighboring carriers are the same as each other, CQI feedback of long term-wideband properties may be omitted for the other carrier. Alternatively, exact channel status may be reported with reducing feedback overhead by feeding back the difference value between CQIs of the neighboring carriers.

Figure 13:
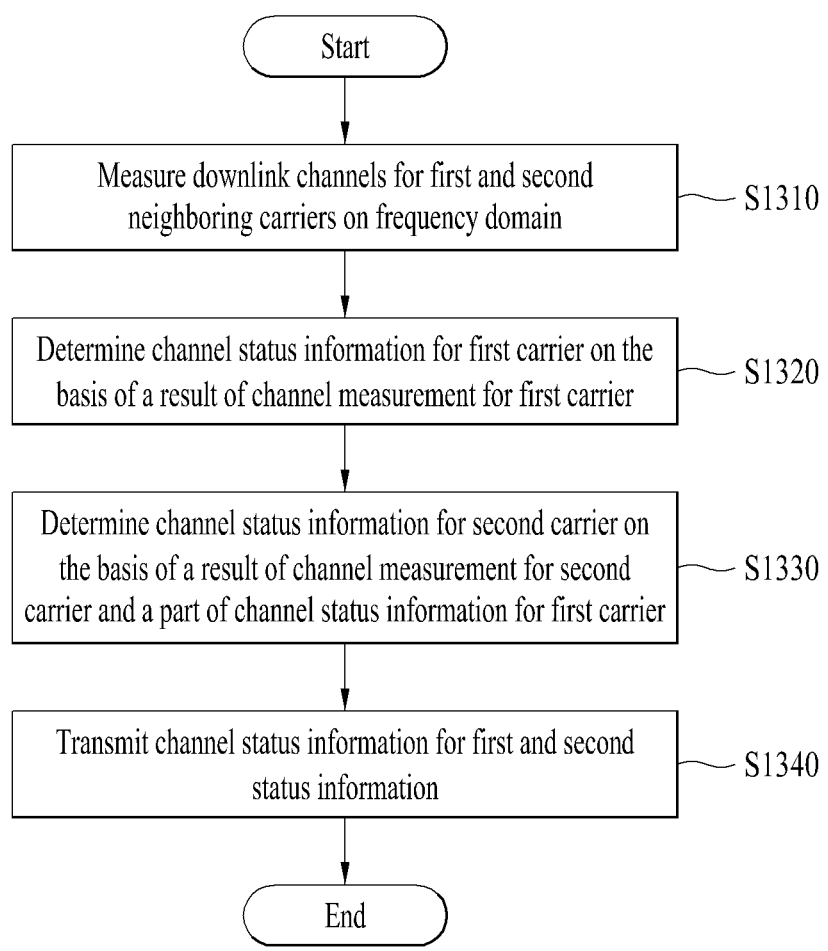
FIG. 13 is a diagram illustrating a method for transmitting CSI in accordance with one embodiment of the present invention.

FIG. 13 is a diagram illustrating a method for transmitting CSI in accordance with one embodiment of the present invention.

At step S1310, the user equipment may measure a downlink channel from the base station on the first carrier (first cell or first CC) and the second carrier (second cell or second CC). In this case, the first and second carriers are neighboring carriers on the frequency domain. Also, measurement of the downlink channel may be performed by the user equipment using a downlink reference signal (for example, channel status information-reference signal (CSI-RS) transmitted from the base station on the first and second carriers.

At step S1320, the user equipment may determine CSI for the first carrier on the basis of the result of channel measurement for the first carrier. In other words, the user equipment may determine RI, W1, W2 and CQI for the first carrier.

At step S1330, the user equipment may determine CSI for the second carrier on the basis of the result of channel measurement for the second carrier. In this case, as described in the various embodiments suggested in the present invention, considering that CSI (RI and W1) of long term-wideband properties for the second carrier has a similar value of CSI of long term-wideband properties for the first carrier, CSI feedback overhead for the second carrier may be reduced. In other words, CSI for the second carrier may be determined on the basis of a part (that is, CSI of long term-wideband properties) of CSI for the first carrier and the result of channel measurement for the second carrier.

For example, supposing that RI for the first carrier is the same as that for the second carrier, the other CSI (W1, W2 and CQI) for the second carrier may be determined. Also, supposing that W1 for the first carrier is the same as that for the second carrier, the other CSI (RI, W2 and CQI) for the second carrier may be determined. Also, supposing that RI and W1 for the first carrier is the same as those for the second carrier, W2 and CQI for the second carrier may be determined. In this case, CSI (RI and/or W1) of long term-wideband properties for the second carrier may not be fed back to the base station.

Also, instead of CSI (RI and/or W1) of long term-wideband properties for the second carrier, information (RI' and/or W2') indicating a difference value between CSI (RI and/or W1) of long term-wideband properties for the first carrier and CSI (RI and/or W1) of long term-wideband properties for the second carrier may be fed back.

Also, the step S1320 and the step S1330 may be performed at the same time (in parallel).

At step S1340, the user equipment may transmit CSI for the first and second carriers, which are determined at the steps S1320 and S1330, to the base station.

For example, at step S1340, RI, W1, W2 and CQI for the first carrier are all transmitted, but one or more of CSI (RI and W1) of long term-wideband properties for the second carrier may not be transmitted. For example, W2 and CQI for the second carrier may be transmitted. Also, RI, W2 and CQI for the second carrier may be transmitted. Also, W1, W2 and CQI for the second carrier may be transmitted. Also, RI, W2 and CQI for the second carrier may be transmitted.

Also, as described above, RI' and/or W2' may be transmitted instead of RI and/or W1 for the second carrier. For example, RI', W2 and CQI for the second carrier may be transmitted. Also, W2', W2 and CQI for the second carrier may be transmitted. Also, RI', W1, W2 and CQI for the second carrier may be transmitted. Also, RI', W1, W2 and CQI for the second carrier may be transmitted. Also, RI', W2' W2 and CQI for the second carrier may be transmitted.

The matters described in the aforementioned various embodiments of the present invention may independently be applied to or two or more embodiments may simultaneously be applied to the method for transmitting and receiving CSI for multiple carriers in accordance with the present invention as described with reference to FIG. 13. The repeated description will be omitted for clarification.

Also, in the description of the various embodiments according to the present invention, the base station has been described as an example of the downlink transmission entity and the user equipment has been described as an example of the uplink transmission entity. However, the scope of the present invention is not limited to the above examples. In other words, the same principle of the present invention described through the various embodiments of the present invention may equally be applied to the case where the relay node is the downlink transmission entity to the user equipment or the uplink reception entity from the user equipment, or the case where the relay node is the uplink transmission entity to the base station or the downlink reception entity from the base station.

Figure 14:
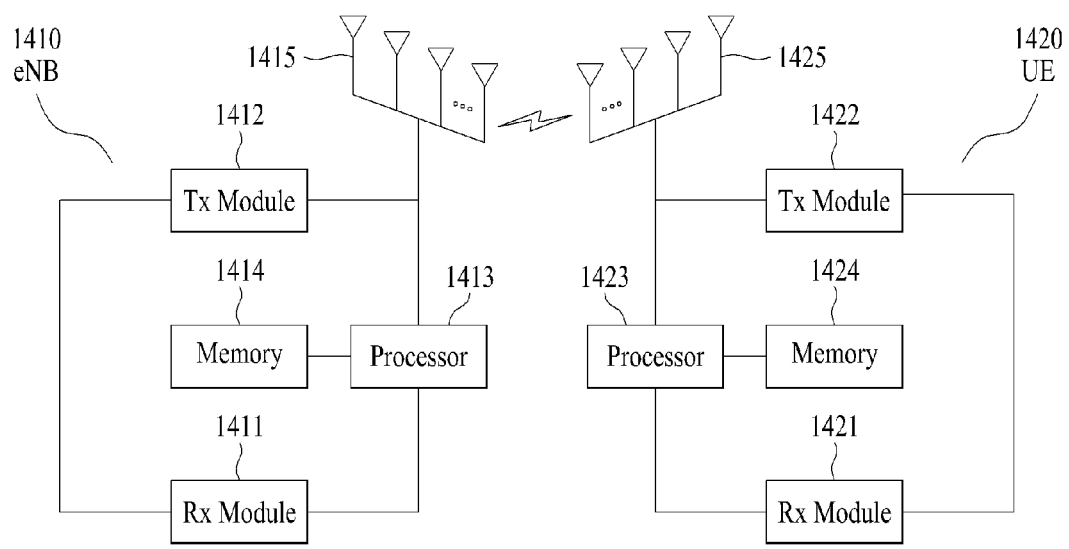
FIG. 14 is a diagram illustrating a preferred configuration of a base station and a user equipment according to the present invention.

FIG. 14 is a diagram illustrating a configuration of a base station and a user equipment according to the present invention.

Referring to FIG. 14, the base station 1410 according to the present invention may include a reception module 1411, a transmission module 1412, a processor 1413, a memory 1414 and a plurality of antennas 1415. The plurality of antennas 1415 mean the base station that supports MIMO transmission and reception. The reception module 1411 may receive various signals, data, and information on the uplink from the user equipment. The transmission module 1412 may transmit various signals, data, and information on the downlink to the user equipment. The processor 1413 may control the overall operation of the base station 1310.

The base station 1410 according to one embodiment of the present invention may be configured to transmit a downlink signal to the user equipment and receive CSI for multiple carriers fed back from the user equipment. The processor 1413 of the base station may be configured to transmit a downlink reference signal on the multiple carriers through transmission module 1412. Also, the processor 1413 may be configured to receive CSI for the multiple carriers from the user equipment through the reception module 1411. The CSI received by the base station may include all kinds of CSI for one of neighboring carriers on the frequency domain, and may not include a part of CSI of long term-wideband properties for the other carrier.

The processor 1413 of the base station 1410 may perform operation process of information received by the base station 1410 and information to be transmitted to the outside, and the memory 1414 may store the operation processed information for a predetermined time and may be replaced with a buffer (not shown).

Referring to FIG. 14, the user equipment 1420 according to the present invention may include a reception module 1421, a transmission module 1422, a processor 1423, a memory 1424, and a plurality of antennas 1425. The plurality of antennas 1425 mean the user equipment that supports MIMO transmission and reception. The reception module 1421 may receive various signals, data, and information on the downlink from the base station. The transmission module 1422 may transmit various signals, data, and information on the uplink to the base station. The processor 1423 may control the overall operation of the user equipment 1420.

The user equipment 1420 according to one embodiment of the present invention may be configured to transmit CSI for multiple carriers. The processor 1423 of the user equipment may be configured to measure a downlink channel for first and second neighboring carriers on the frequency domain. Also, the processor 1423 may be configured to determine channel status information for the first carrier on the basis of the result of channel measurement for the first carrier. Also, the processor 1423 may be configured to determine channel status information for the second carrier on the basis of a part of channel status information for the first carrier and the result of channel measurement for the second carrier. Also, the processor 1423 may be configured to transmit the channel status information for the first and second carriers through the transmission module 1422.

The processor 1423 of the user equipment 1420 may perform operation process of information received by the user equipment 1420 and information to be transmitted to the outside, and the memory 1424 may store the operation processed information for a predetermined time and may be replaced with a buffer (not shown).

The matters described in the aforementioned various embodiments of the present invention may independently be applied to the detailed configuration of the base station and the user equipment, or two or more embodiments may be applied to the detailed configuration of the base station and the user equipment. The repeated description will be omitted for clarification.

Also, the description of the base station 1410 in the description of FIG. 14 may equally be applied to the relay station as the downlink transmission entity or the uplink reception entity, and the description of the user equipment 1420 may equally be applied to the relay station as the downlink reception entity or the uplink transmission entity.

The aforementioned embodiments according to the present invention may be implemented by various means, for example, hardware, firmware, software, or their combination.

If the embodiment of the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention may be applied to various mobile communication systems that support MIMO transmission.

The invention claimed is:

1. A method for transmitting channel status information for multiple carriers, the method comprising:
   measuring downlink channels for a first carrier and a second carrier, wherein the second carrier is a neighboring carrier of the first carrier on a frequency domain;
   determining channel status information of the first carrier on the basis of a result of a channel measurement of the first carrier;
   determining a part of channel status information of the second carrier on the basis of a result of a channel measurement of the second carrier, the part of the channel status information of the second carrier including long term-wideband precoding matrix information of the second carrier, the part of the channel status information of the first carrier including long term-wideband precoding matrix information of the first carrier;
   obtaining a factor for the long term-wideband precoding matrix information of the second carrier using the long term-wideband precoding matrix information of the first carrier and the long term-wideband precoding matrix information of the second carrier, the factor indicating a difference value between the long term-wideband precoding matrix information of the first carrier and the long term-wideband precoding matrix information of the second carrier; and
   transmitting the channel status information of the first carrier and the factor,
   wherein the factor is obtained by the following equation:

$$W2' = \underset{cw \in CB}{\operatorname{argmin}} d(W1_{CC1}, f(W1_{CC0}, cw)),$$

and
   wherein the W2' indicates the factor indicating the difference value between the long term-wideband precoding matrix information of the first carrier and the long term-wideband precoding matrix information of the second carrier,
   the W1CC1 indicates the long term-wideband precoding matrix information of the second carrier,
   the W1CC0 indicates the long term-wideband precoding matrix information of the first carrier,
   the CB indicates a codebook of a short term-subband precoding matrix information of the second carrier,
   the cw indicates a codeword that belongs to the codebook of the short term-subband precoding matrix information of the second carrier,
   the d(A, B) indicates a distance between a matrix A and a matrix B, and
   the f(A, B) indicates a codebook transformation function.

2. The method according to claim 1, wherein the part of the channel status information of the second carrier further includes.

3. The method according to claim 2, the rank information of the second carrier is not transmitted to the base station.

4. The method according to claim 1, wherein the part of the channel status information of the second carrier further includes short term-subband precoding matrix information of the second carrier, and
   wherein the part of the channel status information of the first carrier further includes short term-subband precoding matrix information of the first carrier.

5. The method according to claim 3, further comprising:
   obtaining information indicating a difference value between rank information of the first carrier and the rank information of the second carrier; and
   transmitting the information indicating the difference value between the rank information for the first carrier and the rank information for the second carrier instead of the rank information of the for the second carrier.

6. A user equipment for transmitting channel status information for multiple carriers, the user equipment comprising:
- a reception module configured to receive downlink signals on first and second carriers from a base station;
- a transmission module configured to transmit an uplink signal to the base station; and
- a processor controlling the user equipment, which includes the reception module and the transmission module, the processor being configured to:
- measure the downlink channels for the first carrier and the second carrier, wherein the second carrier is a neighboring carrier of the first carrier on a frequency domain,
- determine channel status information of the first carrier on the basis of a result of a channel measurement of the first carrier,
- determine a part of channel status information of the second carrier on the basis of a result of a channel measurement of the second carrier, the part of the channel status information of the second carrier including long term-wideband precoding matrix information of the second carrier, the part of the channel status information of the first carrier including long term-wideband precoding matrix information of the first carrier,
- obtain a factor for the long term-wideband precoding matrix information of the second carrier using the long term-wideband precoding matrix information of the first carrier and the long term-wideband precoding matrix information of the second carrier, the factor indicating a difference value between the long term-wideband precoding matrix information of the first carrier and the long term-wideband precoding matrix information of the second carrier, and
- transmit the channel status information of the first carrier and the factor, wherein the factor is obtained by the following equation:

$$W2' = \mathop{\mathrm{argmin}}_{cw \in CB} d(W1_{CC1}, f(W1_{CC0}, cw)),$$

and wherein the W2' indicates the factor indicating the difference value between the long term-wideband precoding matrix information of the first carrier and the long term-wideband precoding matrix information of the second carrier, the $W1_{CC1}$ indicates the long term-wideband precoding matrix information of the second carrier, the $W1_{CC0}$ indicates the long term-wideband precoding matrix information of the first carrier, the CB indicates a codebook of a short term-subband precoding matrix information of the second carrier, the cw indicates a codeword that belongs to the codebook of the short term-subband precoding matrix information of the second carrier, the d(A, B) indicates a distance between a matrix A and a matrix B, and the f(A, B) indicates a codebook transformation function.

7. The user equipment according to claim 6, wherein the part of the channel status information of the second carrier further includes rank information of the second carrier.

8. The user equipment according to claim 7, wherein the rank information of the second carrier is not transmitted to base station.

9. The user equipment according to claim 6, wherein the part of the channel status information of the second carrier further includes short term-subband precoding matrix information of the second carrier, and wherein the part of the channel status information of the first carrier further includes short term-subband preceding matrix information of the first carrier.

10. The user equipment according to claim 8, wherein the processor obtains information indicating a difference value between rank information of the first carrier and the rank information of the second carrier, and transmits the information indicating the difference value between the rank information for the first carrier and the rank information for the second carrier instead of the rank information of the second carrier.

* * * * *